United States Patent

[11] 3,602,818

[72] Inventors Germain Francois Louis Carrette Anderlecht;
Michel Jules Philemon Christiaens, Molenbeek-St. Jean, both of, Belgium

[21] Appl. No. 825,876
[22] Filed May 19, 1969
[45] Patented Aug. 31, 1971
[73] Assignee U.S. Philips Corporation New York, N.Y.
[32] Priority May 17, 1968
[33] Netherlands
[31] 6806968

[54] DELAY LINE AMPLITUDE COMPRESSION TRANSMISSION SYSTEM
5 Claims, 3 Drawing Figs.

[52] U.S. Cl. .......... 325/65, 179/15.55 R, 325/50, 333/14
[51] Int. Cl. .......... H04b 1/10
[50] Field of Search .......... 325/49, 50, 63, 65, 42; 333/14; 179/15.55 R

[56] References Cited
UNITED STATES PATENTS

| | | | |
|---|---|---|---|
| 2,874,222 | 2/1959 | De Jager .......... | 325/50 |
| 3,024,312 | 3/1962 | Daguet .......... | 325/50 X |

*Primary Examiner*—Robert L. Griffin
*Assistant Examiner*—R. S. Bell
*Attorney*—Frank R. Trifari

ABSTRACT: An amplitude compression-expansion circuit features a cotransmitted control signal that indicates the degree of compression at the transmitter for use at the receiver to control the degree of expansion. The compression control signal is applied to the compressor through a delay line, while the receiver features two expandors.

INVENTORS
GERMAIN CARETTE
MICHEL CHRISTIAENS
BY
Frank R. Trifari
AGENT

INVENTORS
GERMAIN CARETTE
MICHEL CHRISTIAENS
BY
Frank R. Trifari
AGENT

DELAY LINE AMPLITUDE COMPRESSION TRANSMISSION SYSTEM

A prior application Ser. No. 665,473, filed Sept. 5, 1967, now U.S. Pat. No. 3,559,068, relates to a system for the transmission of signals and transmitters and receivers for use in said system comprising a transmitter including a dynamic compressor and a receiver having a dynamic expandor. The dynamic compressor is provided with a compandor, a compression rectifier fed by the signals to be transmitted and a control signal source which supplies a control signal situated outside the signal band. The signals to be transmitted and the control signal are applied to the compandor, while the dynamic expandor is provided with a compandor and a control signal filter for the selection of the cotransmitted control signal. The control signal source of the dynamic compressor is provided at the transmitter and in said system with a time modulator which is controlled by the output signal of a difference producer to the input terminals of which are applied the output signal of the compression rectifier on the one hand and the output signal of a time demodulator connected to the output circuit of the time modulator on the other hand. The output signal is also applied as a control signal to the compandor. The expandor includes a difference producer the output signal of which controls the compandor, and to the input terminals of which are applied the output signals of a time demodulator on the one hand which is fed by the received control signal selected in the control signal filter and limited in an amplitude limiter, and the output signal of a rectifier on the other hand to which the output signal of the compandor is applied.

As was described in the prior application, the above-mentioned transmission system can advantageously be used for music transmission over carrier communications of great length, for example, 2500 kms. and more. A great reduction of the noise introduced in the carrier communication of great length is obtained with this transmission system on the one hand while an excellent reproducing quality is obtained on the other hand.

It is an object of the invention to bring the already eminent reproducing quality to an optimum value while maintaining the advantages of the transmission system of the type described in the preamble.

The transmission system according to the invention is characterized in that the control signal derived at the transmitter end from the output circuit of the time demodulator is applied to the compandor through a delaying network, while a second compandor preceding the first compandor is incorporated at the receiver end, said second compandor being exclusively controlled by the time demodulator included in the expandor and being fed by the selected control signal.

In order that the invention may be readily carried into effect, it will now be described in detail, by way of example with reference to the accompanying diagrammatic drawings, in which:

FIG. 2 shows a receiver according to the invention cooperating with the transmitter of FIG. 1, while

Figure 1:
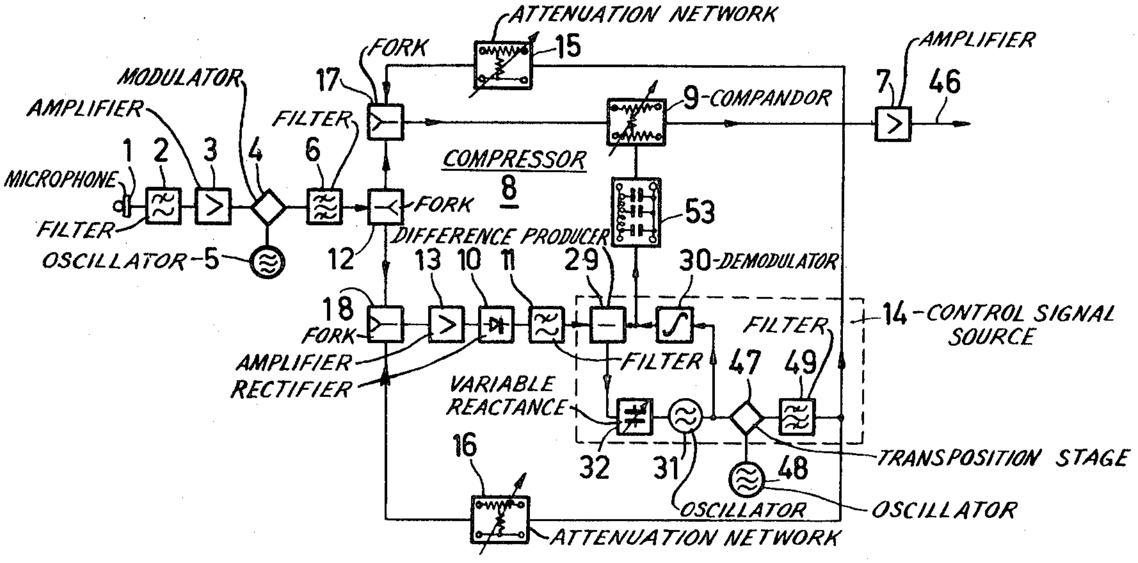
FIG. 1 shows a transmitter according to the invention.

The transmitter according to the invention and shown in FIG. 1 forms part of a carrier telephony system for the transmission of signals over a distance of, for example, 2500 kms. and is intended for the transmission of music signals situated, for example, in the band of 0.03–15 kc./s. In this band a bandwidth of approximately 20 kc./s. is reserved per music channel.

In this system the music signals originating from a microphone 1 are applied through a filter 2 passing the music signals at a pass band of 0.03–15 kc./s. and a low frequency amplifier 3 to a single sideband modulator 4 with a local oscillator 5 connected thereto and to a single sideband filter 6, the single sideband modulator 4 transposing the music signals to the band of 88.03–103 kc./s. with the possible interposition of a transposition stage. This single sideband signal is applied for further transmission to an output line 46 after amplification in an amplifier 7.

A compressor 8 is provided for compression between the single sideband filter 6 and the amplifier 7 which compressor includes a compandor 9 and a compression rectifier 10 having an associated low-pass filter 11 at, for example, a cutoff frequency of 200 c./s. at which the single sideband signals to be transmitted are applied by means of a fork 12 to the compandor 9 and through an amplifier 13 to the compression rectifier 10. The compression rectifier 10 is formed by a mean-value rectifier while the compandor 9 consists of an adjustable attenuation network controlled by a control voltage in which network rectifier cells are used as variable resistors.

The compressor 8 also includes a control signal source 14 for the generation of a control signal situated outside the signal band which signal is applied together with the single sideband signals to both the compandor 9 and to the compression rectifier 10 through adjustable attenuation network 15, 16 and forks 17, 18. The level of the control signal is adjusted by means of the adjustable attenuator 15, 16 to a considerably lower value than the maximum level of the single sideband signals at the input of the compandor 9 and the compression rectifier 10.

In the system described thus far a voltage varying with the dynamic range of the single sideband signals appears at the output circuit of the compression rectifier 10 by rectification of the single sideband signals, which voltage follows the dynamic range of the music signals more accurately than that which would have been obtained by direct rectification of the low frequency music signals. If the voltage of the music signals increases at the compression rectifier 10 at a level of the music signals above that of the control signal, this increase causes a corresponding increase of the compression voltage so that the attenuation of the compandor 9 is increased resulting in an increase of attenuation counteracting the said voltage increase of the music signals, while conversely a voltage decrease of the music signals causes an attenuation decrease of the compandor 9. The control signal experiences a corresponding variation of attenuation in the compandor 9 and thus characterizes by its amplitude the compression of the single sideband signals applied to the compandor 9.

However, with a decrease of the music level to below the level of the control signal or in the absence of music signals, the compression voltage at the output of compression rectifier 10 will mainly be supplied by the constant control signal which determines the minimum attenuation of the compandor 9. With the aid of the adjustable attenuation network 16 the level of the control signal and thus the lower limit of the compression control range is adjusted as desired.

Figure 2:
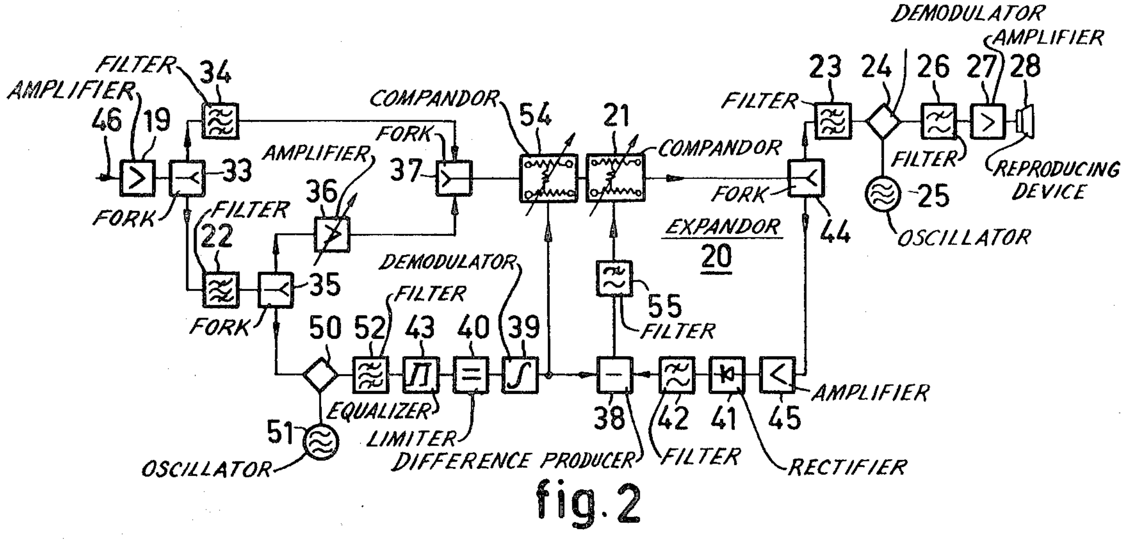

FIG. 2 shows the receiver cooperating with the transmitter of FIG. 1 in which the single sideband music signals received through line 46 and the cotransmitted control signal are applied to an expandor 20 through an amplifier 19, the expandor being provided with a compandor 21.

For the expansion control to be described hereinafter the expandor 20 is provided with a control signal filter 22 for the selection of the cotransmitted control signal, the expanded music signal derived from the output of the compandor 21 being applied through a filter 23 exclusively passing the single sideband music signal to a single sideband demodulator 24 having a local carrier oscillator 25 connected thereto and an associated low-pass filter 26. The low frequency music signal in the band of 0.03–15 kc./s. appears at the output of the low-pass filter 26 which music signal is applied to a reproducing device 28 through a low frequency amplifier 27.

Figure 3:
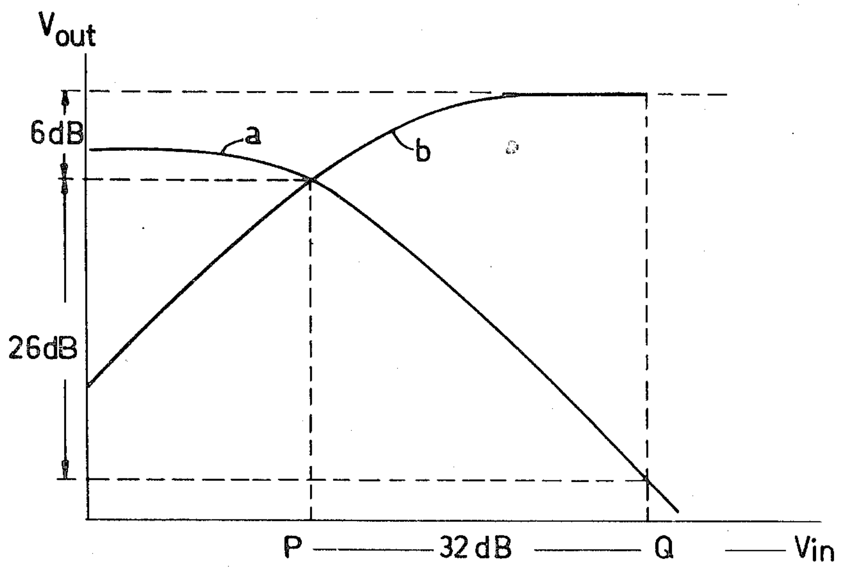
FIG. 3 shows a few control characteristics to explain the transmitter and receiver shown in FIG. 1 and FIG. 2.

For explanation of the transmission system described, the control characteristic of the compression system shown in FIG. 1 is illustrated in FIG. 3 in which the level of the control signal appearing at the output of the compandor and the level of the single sideband music signal are plotted in db. as a function of the level of the single sideband music signal $V_{in}$ applied to the input of the compandor. To obtain optimum conditions in this system the level of the control signal at the input of the compandor 9 and of the amplifier 13, respectively, is adjusted at a suitable value with the aid of the adjustable attenuators 15, 16, for example, in intensity ratios of the control signal and the single sideband music signal are 31 db. and 26 db., respectively, at a maximum music level so that these intensity ratios mutually differ by a factor of 1.78.

In conformity with the preceding explanation the compandor has a substantially constant attenuation at an input level of the single sideband music signal appearing at the compression rectifier 10 which level is smaller than the input level of the control signal, while above said level the attenuation of the compandor 9 increases with the level of the said single sideband music signal. In this control characteristic the variation of the level of the control signal is represented by the curve *a*, while the curve *b* shows the variation of the level of the single sideband music signal.

The compression control range of the shown transmission system for music transmission over a distance of 2500 kms. is indicated in the FIG. by PQ and approximately 32 db. As is shown by this FIG. the level *b* of the single sideband music signal in the compression control range PQ of approximately 32 db. increases only by 6 db. and the level *a* of the control signal decreases by 26 db. the level of the control signal in case of a music signal of maximum intensity being approximately 32 db. weaker than that of the single sideband music signal.

The use of the cotransmitted control signal affords the important advantage that the dynamic range variations at the receiver end can accurately be regained independent of the control characteristics of the compandors 9, 21 used and of variations of attenuations in the transmission path 46, the control signal characterizing by its level the variations of attenuation which are experienced by the single sideband music signal in the transmission path. It is, however, found that a decrease of the reproduction quality occurs in the described system for music transmission over the 2500 km. long carrier communication, which decrease as was found by the applicant is to be described to the fact that particularly during the strong music passages the then low level of the control signal (compare FIG. 3) is influenced in a disturbing manner by the noise in the said transmission path which may be approximately 4300 pW per kc./s. bandwidth at a 2500 km. long carrier communication.

Together with an extreme independency of the control characteristics of the compandors 9, 21 used at the transmitter and receiver ends, and of the variations of attenuation in the transmission path 46 an extreme reduction of this noise influence is obtained as described in the prior application in that the control signal source 14 of the compressor 8 is provided with a time modulator in the form of a frequency modulator which is controlled by the output signal of a difference producer 29, for example, consisting of a difference amplifier to the input terminals of which are applied the output signal of the compression rectifier 10 and the output signal of a frequency demodulator 30 connected to the output circuit of the frequency modulator. In this case the frequency modulator is formed by a variable reactance 32 connected to a local oscillator 31 having a frequency of 6.6 kc./s. which reactance causes a maximum frequency shift of the oscillator frequency of, for example, 1.5 kc./s. the oscillator frequency being applied both to the compandor 9 and to the compression rectifier 10 after frequency transposition in a transposition stage 47 with associated oscillator 48 having a frequency of 80 kc./s. and output filter 49 through attenuation networks 15, 16 and forks 17, 18; in fact, the absolute accuracy of the frequency modulation of the control signal is improved which enhances the accuracy of the compansion by starting from the oscillator 31 of low frequency for the frequency modulation of the generated control signal in the band of 85.1–86.6 kc./s.

In the system shown the circuit output difference producer 29, variable reactance 32, oscillator 31, frequency demodulator 30, input difference producer 29 forms a feedback control system in which the output signal of the frequency demodulator 30 is forced to follow exactly the output signal of the compression rectifier 10. If, for example, the output signal of the compression rectifier 10 increases the output signal of the difference producer 29 will also start to increase and cause an increase of its frequency deviation relative to the normal oscillator frequency of 6.6 kc./s. through the variable reactance 32 in the oscillator 31 which results in an increase of the output signal of the frequency demodulator 30 which counteracts the increase of the output signal of the difference producer 29. Conversely, with a decrease of the output signal of the compression rectifier 10 the frequency deviation of the oscillator 31 will decrease and a corresponding decrease of the output signal of the frequency demodulator 30 will occur which will counteract the decrease of the output signal of the difference producer 29 caused by the decrease of the output signal of the compression rectifier 10. Thus a level variation of the output voltage of the compression rectifier 10 will exactly be followed by a frequency variation of the oscillator frequency and a corresponding variation of the output signal of the frequency demodulator 30 which output signal of the frequency demodulator 30 is applied as a control signal to the compandor 9. A substantially constant loop gain is ensured by suitable construction of the frequency demodulator 30 and the variable reactance 32.

Characteristic of the system according to the invention is that at a level variation of the music signals the control signal cotransmitted through line 46 simultaneously experiences a variation both in its level and in its frequency, which variations are mutually opposed. Particularly with a strong music level the control signal will have a low level (see FIG. 3) and a high frequency deviation, whereas with a weak music level the control signal will have a high level and a low frequency deviation so that the disturbing noise influence is reduced to a far extent at the receiver end in regaining the dynamic range of the music signals as a function of the control signal.

In order to regain at the receiver end the signal to be transmitted from the single sideband music signal received through line 46 in the band of 88.03–103 kc./s. and the control signal in the band of 85.1–86.6 kc./s. the received signals are applied to separation filters 22, 34 through the amplifier 19 with the aid of a fork 33, the single sideband music signal being derived from the separation filter 34 having a passband of 88.03–103 kc./s. and the control signal being derived from separation filter 22 in the form of the control signal filter having a pass band of 85.1–86.6 kc./s. In this case the control signal is applied to a second fork 35 in which the control signal derived from one branch of the fork is utilized for the expansion control, while the control signal derived from the other branch of the fork is applied to the compandor 21 after joining in a fork 37 with the single sideband music signal through an adjusting member in the form of an adjusting amplifier 36 which will be discussed hereinafter.

For expansion control the expandor 20 includes a difference producer 38 the output signal of which controls the compandor 21 and to the input terminals of which are applied on the one hand the output signal of a frequency demodulator 39 which is fed by the control signal selected in the control signal filter 22 after frequency transposition in a frequency transposition stage 50 with associated oscillator 51 of 80 kc./s. and output filter 52 to the band 5.1–6.6 kc./s. and after amplitude limiting in an amplitude limiter 40, and on the other hand the output signal of a rectifier 41 including an associated low-pass filter 42 having a cutoff frequency of, for example, 1000 c./s. to which rectifier 41 the output signal of the compandor 21 is applied. In this case the control signal derived from the fork 35 is applied to the limiter 40 through and equalizing network 43, while the output signal of the compandor 21, using a fork 44, is applied to the single sideband demodulator 24 and also through an amplifier 45 to the rectifier 41 connected to the difference produced 38, which rectifier is designed as a mean-value rectifier.

For the expansion control the control signal selected in the control signal filter 22 and varying both in amplitude and in frequency is applied at a constant amplitude value to the frequency demodulator 39 after equalizing in the equalizing network 43 and amplitude limiting in the amplitude limiter 40, the output signal of the said frequency demodulator controlling the compandor 21 in the loop: output difference producer 38, compandor 21, fork 44, amplifier 45, rectifier 41, low-pass filter 42, input difference producer 38. The loop described forms as such a feedback control system in which the output signal of the rectifier 41 is forced to follow exactly in its level the output signal of the frequency demodulator 39 with the result that the output signal of the rectifier 41 at the receiver end follows exactly the output signal of the compression rectifier 10, since in fact the output signal of the frequency demodulator 39 is always equal to the output signal of the frequency demodulator 30 at the transmitter end.

If the intensity ratio of the control signal received through line 46 and the single sideband music signal, which intensity ratio has remained unchanged in the transmission of these signals from the input of the compandor 9 at the transmitter end to the fork 33 at the receiver end, is made equal by additional amplification of the control signal in the adjusting amplifier 36 at the input of the compandor 21 to the intensity ratio of these signals at the input of compression rectifier 10, in fact, these two intensity ratios in the embodiment described differ by a constant factor of 1.78 as already mentioned hereinbefore, then the intensity ratio of the control signal and the single sideband music signal at the input of these rectifiers 41, 10 is also the same with equal output signal of the rectifier 41 at the receiver end and of the compression rectifier 10 at the transmitter end. Then the single sideband music signals at the input of the rectifier 41 at the receiver end is exactly equal to the single sideband music signal at the input of the compression rectifier 10 at the transmitter end and, apart from the constant fork attenuation of the fork 44 and the constant amplification factor of the amplifier 45, is thus also equal to the single sideband music signal at the output of the compandor 21 independent of the control characteristics of the compandors 9, 21 and variations of attenuation in the transmission path. A quick control can be used without the risk of instabilities upon regaining the signal dynamic range in the feedback control system as a result of the absence of selective filters: output difference producer 38, compandor 21, fork 44, amplifier 45, rectifier 41, low-pass filter 42, input difference producer 38.

In addition to the mentioned advantages of this sensitive dynamic range control which is also independent of the control characteristics of the compandors 9, 21 and of variations of attenuation in the transmission path, the system according to the invention is distinguished by its extreme insensitivity to noise which is caused by the fact that frequency modulation is also used for the transmission of the control signal, the occurring level and frequency variations being mutually opposed. For example, at a small level of the control signal and hence an associated comparatively high sensitivity to noise the control signal actually shows a great frequency deviation so that the associated sensitivity to noise has a favorable value. Both effects counteract each other and in this manner a considerable improvement in the S/R-ratio was obtained in the described embodiment over the entire dynamic control range of 32 db. which, relative to the known systems mentioned hereinbefore, provides an improvement of approximately 20 db.

As already described in the prior application an eminent reproducing quality was obtained with the system described thus far, more particularly during listening no deviations of the fidelity of the music reproduction were found, but the occurrence of weak interference tones could be established upon stricter examination by means of measuring equipment using test signals. As was found from further investigations, the cause of the occurrence of these weak interference tones had to be found in nonlinear phenomena in the loop of the expandor 20: compandor 21, fork 44, amplifier 45, rectifier 41, low-pass filter 42, difference producer 38, compandor 21, which loop, as was already stated in the foregoing, has the function of rendering the form of the output signal of the compandor 21 in the expandor 20 accurately equal to the input signal of the compandor 9 in the compressor 8.

In conformity with the invention these interference tones are reduced to a minimum value, thereby obtaining an optimum reproducing quality in that the control signal derived from the output circuit of the frequency demodulator 30 is applied at the transmitter end to the compandor 9 through a delaying network 53 whose delay time has been made substantially equal to the transit time difference between the broadband single sideband signal on its path from the compandor 9 at the transmitter end to the compandor 21 at the receiver end, and the narrow-band control signal on its path from the oscillator 31 at the transmitter end to the frequency demodulator 39 at the receiver end. In fact, the narrow-band control signal relative to the broadband single sideband signal experiences a time delay on its path from the oscillator 31 to the frequency demodulator 39 as a result of the selective filters located in its transmission path, which time delay is approximately 1.5 m.sec. in the embodiment described. Since the delaying network 53 introduces a time delay in the narrow-band control signal, its construction is particularly simple, for example, the delaying network 53 in the embodiment described includes three coils to obtain the delay time of approximately 1.5 m.sec.

According to the invention, in combination with the described step taken at the transmitter end, a second compandor 54 preceding the first compandor 21 is included at the receiver end which second compander 54 is exclusively controlled by the frequency demodulator 39 fed by the selected control signal and included in the expandor 20. Both steps combined result in a considerable reduction of the occurring interference tones, as will now further be described.

As in the system according to the prior application a control signal varying in amplitude and in frequency is cotransmitted in this system for the purpose of compansion with the single sideband signals so as to accurately regain the signal dynamic range at the receiver end, the loop of the expandor 20: compandor 21, fork 44, amplifier 45, rectifier 41, low-pass filter 42, difference producer 38, compandor 21 bringing about likewise as in the prior application a correction of remaining deviations of the output signal of the compandor 54 at the receiver end relative to the input signal of the compandor 9 at the transmitter end which deviations may result from different causes. The magnitude of the correction of the remaining deviations of the output signal of the compandor 54 at the receiver end relative to the input signal of the compandor 9 at the transmitter end is reduced to a considerable extent; in fact, the amplitude of the control voltage generated in the frequency demodulator 39 at the receiver end for controlling the compandor 54 is not only equal to that of the frequency demodulator 30 at the transmitter end for controlling the compandor 9, but also the incorporation of the delaying network 53 in the circuit from the frequency demodulator 30 to the compandor 9 causes the compansions relative to the single sideband signal in the compandors 9, 54 at the transmitter and receiver ends to take place at the same instant.

A satisfactory conformity is already obtained in this manner between the single sideband signals at the input of the compandor 21 at the receiver end and at the input of the compandor 9 at the transmitter end so that the signal correction in the loop of the expandor 20: compandor 21, fork 44, amplifier 45, rectifier 41, low-pass filter 42, difference producer 38, compandor 21 is reduced to a considerable extent and hence also the interference tones caused by the nonlinear phenomena in this loop. Due to the use of the steps according to the invention a shift of the signal correction to low frequencies appears to have occurred at the same time as a result of which the line between the difference producer 38 and the compandor 21 includes a low-pass filter 55 having a low cutoff frequency for the purpose of further reduction of unwanted interference tones: for example, the adjusting time of the loop has been brought to approximately 10 m.sec. by using the low-pass filter 55. Both effects combined, namely in the first place a reduction of the signal correction in the loop of the expandor 20: compandor 21, fork 44, amplifier 45, rectifier 41, low-pass filter 42, difference producer 38, compandor 21, and in the second place the use of the additional low-pass filter 55 in the loop result in the unwanted interference tones being suppressed in a progressive manner.

Together with the advantages already mentioned in the prior application, namely sensitive control, great independency of the control characteristics at the transmitter and receiver ends, and variations of attenuation in the transmission path 46 and a considerable reduction of the noise influence, the system according to the invention is distinguished by an optimum reproducing quality; for example, the occurring interference tones were reduced by approximately 20 to 30 db. by using the steps according to the present invention.

What is claimed is:

1. A transmitter comprising a source of information signals; a compandor having an input coupled to said information signal source, an output, and a control terminal; a source of control signals having a frequency different from said information signals coupled to said compandor input; a time demodulator having an input coupled to said control signal source and an output; means for time delay having an input coupled to said demodulator output and an output coupled to said control signal source and an output; means for time delay having an input coupled to said demodulator output and an output coupled to said control terminal; a difference signal producer having a first input coupled to said demodulator output, a second input, and an output; a rectifier having an input coupled to said information signal source and an output coupled to said difference producer second input; a time modulator having an input coupled to said difference-signal producer output and an output coupled to said control signal source; and means for transmitting the output of the compandor.

2. A transmitter as claimed in claim 1 wherein said time delay means has a time delay substantially equal to the system time differences between said information and control signals.

3. A receiver comprising means for receiving a signal having information and control signal components; a first compandor having an input coupled to said receiving means, an output, and a control terminal; filter means for selecting said control signal having an input coupled to said receiving means and an output; a time demodulator having an input coupled to said filter output and an output; a second compandor coupled between said receiving means and said first compandor and having a control terminal coupled to said time demodulator output; a difference signal producer having a first input coupled to said demodulator output; a second input and an output coupled to said control terminal; a rectifier coupled between said first compandor output and said difference producer second input, and an output circuit coupled to said first compandor output.

4. A receiver as claimed in claim 3 further comprising a low pass filter coupled between said rectifier and said difference signal producer.

5. A transmission system comprising a transmitter and receiver coupled thereto, said transmitter comprising a source of information; a compandor having an input coupled to said information signal source, an output, and a control terminal; a source of control signals having a frequency different from said information signals coupled to said compandor input; a time demodulator having an input coupled to said control signal source and an output; means for time delay having an input coupled to said demodulator output and an output coupled to said control terminal; a difference signal producer having a first input coupled to said demodulator output, a second input, and an output; a rectifier having an input coupled to said information signal source and an output coupled to said difference producer second input; a time modulator having an input coupled to said difference-signal producer output and an output coupled to said control signal source; and means for transmitting the output of the compandor; said receiver comprising means for receiving a signal having information and control signal components; a first compandor having an input coupled to said receiving means, an output, and a control terminal; filter means for selecting said control signal having an input coupled to said receiving means and an output; a time demodulator having an input coupled to said filter output and an output; a second compandor coupled between said receiving means and said first compandor and having a control terminal coupled to said time demodulator output; a difference signal producer having a first input coupled to said demodulator output, a second input, and an output coupled to said control terminal; a rectifier coupled between said first compandor output and said difference producer second input, and an output circuit coupled to said first compandor output.

PO-1050
(5/69)

UNITED STATES PATENT OFFICE
CERTIFICATE OF CORRECTION

Patent No. 3,602,818 Dated August 31, 1971

Inventor(s) GERMAIN F.L. C. ANDERLECHT ET AL

It is certified that error appears in the above-identified patent and that said Letters Patent are hereby corrected as shown below:

IN THE CLAIMS col. 7, line 30, cancel "signal source and an output;

means for time delay having";

line 31, cancel the line in its entirety;

line 32, cancel "coupled to said control";

Signed and sealed this 17th day of September 1974.

(SEAL)
Attest:

McCOY M. GIBSON JR.
Attesting Officer

C. MARSHALL DANN
Commissioner of Patents